United States Patent [19]

Nespor

[11] Patent Number: 4,558,613
[45] Date of Patent: Dec. 17, 1985

[54] THERMAL WIRE STRIPPER

[76] Inventor: Tony Nespor, 2515 Glencoe Rd., Baltimore, Md. 21234

[21] Appl. No.: 624,241

[22] Filed: Jun. 25, 1984

[51] Int. Cl.⁴ ............................................. H02G 1/12
[52] U.S. Cl. ........................................ 81/9.4; 219/221
[58] Field of Search ..................... 81/9.5 R, 9.51, 9.4; 219/221, 233, 235; 30/140

[56] References Cited

U.S. PATENT DOCUMENTS

| | | | |
|---|---|---|---|
| 1,632,320 | 6/1927 | Sippel et al. | |
| 2,101,913 | 12/1937 | Meyer | 219/233 |
| 2,192,056 | 2/1940 | Watts | |
| 2,415,669 | 2/1947 | Beuschel | |
| 2,848,914 | 8/1958 | Gottfried | 81/9.5 C |
| 3,080,469 | 3/1963 | Benoit | 81/9.5 R |
| 3,199,383 | 10/1965 | Gudmestad | 81/9.51 |
| 3,293,956 | 12/1966 | Ademson et al. | 81/9.5 R |
| 3,636,799 | 1/1972 | Weitala et al. | 81/9.51 |

FOREIGN PATENT DOCUMENTS 799008 7/1958 United Kingdom ................ 219/221

Primary Examiner—James L. Jones, Jr.
Attorney, Agent, or Firm—John F. McClellan, Sr.

[57] ABSTRACT

A wire stripper provides for one-hand thermal-stripping of thermoplastic insulation from wire in a substantial range of wire sizes without need for adjustment or alternation in manipulation of the wire relative to the stripper or of the stripper relative to the wire. The stripping operation requires merely insertion of a free-end of thermoplastic-insulated wire in the larger end of a teardrop-shaped slot in a flat conductive strip tensioned between electrodes passing current through the strip, then withdrawing the free end of wire out of the slot in a direction wedging the insulation in the smaller end of the slot as the wire is withdrawn from it, either with or without a twist of the free end. A novel electrode mount both maintains tension on the flat conductive strip when it is heated and serves as closure of a box that holds the current transformer supplying the electrodes.

8 Claims, 8 Drawing Figures

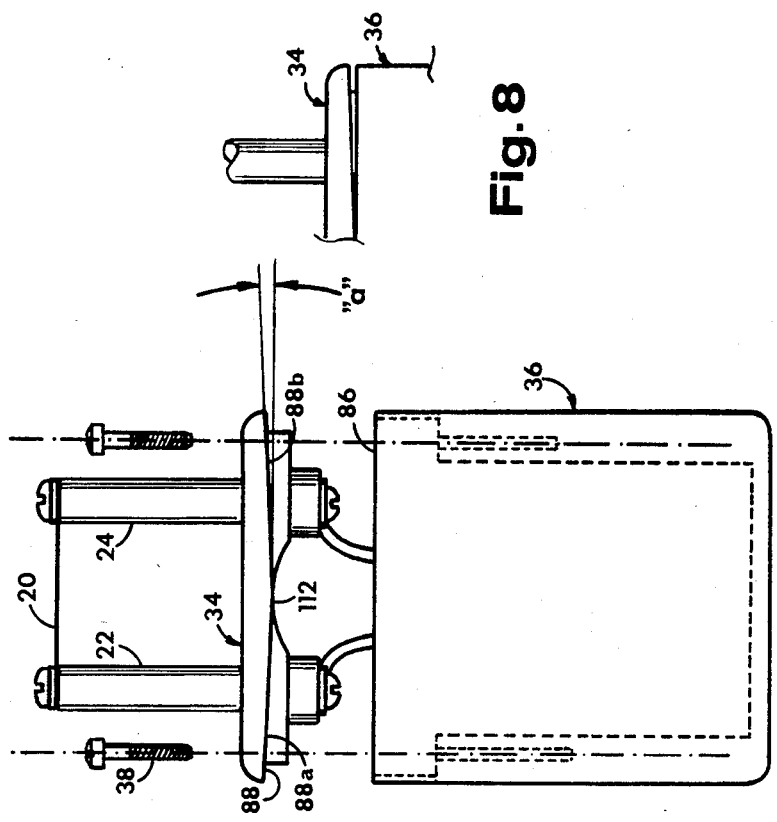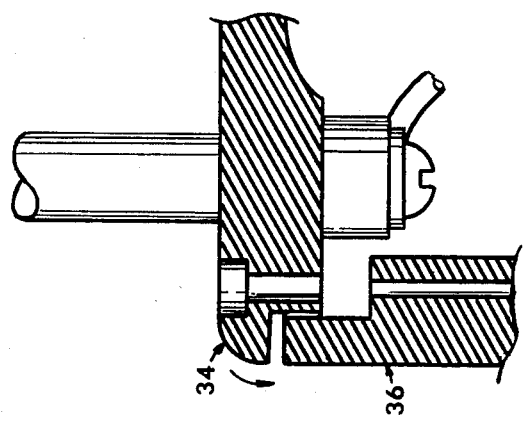

THERMAL WIRE STRIPPER

FIELD OF THE INVENTION

This invention relates generally to tools and specifically to thermal strippers of thermoplastic-insulation from wire.

SUMMARY OF THE INVENTION

In the prior art various wire strippers have been disclosed, including those in the following U.S. patents:

U.S. Pat. No. 1,632,320 to E. H. Sippel and N. J. Wright disclosed an early thermal stripper with connections at the ends of the heated element;

U.S. Pat. No. 2,192,056 to G. V. Watts, 2-27-40, disclosed an interlooped pair of "V"-shaped heated wires operable to strip insulation;

U.S. Pat. No. 2,415,669 to C. B. Beuschel, 2-11-47, disclosed an electrically heated flat metal "V" slot stripper but not with an electrical terminal at each end.

However, it is believed that no wire stripper has been made available that provides the advantages of this invention, including simple, positive stripping without adjustment, through a range of sizes of thermoplastic insulated wire, using only one hand, if desired.

A particular object of this invention is to provide a wire-stripper system that employs a substantially thin flat strip of conductive material with a longitudinal, tapered slot in it and connected at each end to an electrode, with the electrodes being so-mounted on a flexible member as to provide a desirable and adjustable tensioning of the flat strip whether the flat strip is hot or cold.

Further objects are to provide a system as described that uniformly heats the margins along the tapered slot, providing the same temperature for local melting and stripping of the various wire sizes accommodatable and that requires only a minimum of material to be heated.

Yet a further object is to provide a system as described which has an adjustable but detachable clamp enabling the system to be used fixed to a table with it, or hand-held with either hand or in any orientation, without it.

Still further objects are to provide a system as described that positions the stripping element in accessibly spaced relation to the other portions of the systems and that is compact, lightweight, simple, easy to use and safe, and that is fully accessible for repair if damaged or worn.

BRIEF DESCRIPTION OF THE DRAWINGS

The above and other objects and advantages of this invention will become more readily apparent on examination of the following description, including the drawings in which like reference numerals refer to like parts.

FIG. 6 is an elevational view showing partial assembly of cover to housing;

FIG. 7 is an elevational assembly detail in partial section, showing a portion of cover and housing;

FIG. 8 is an elevational assembly detail showing housing and cover partially tightened together; in a heated-strip-tensioning adjustment relation.

DETAILED DESCRIPTION

Figure 1:
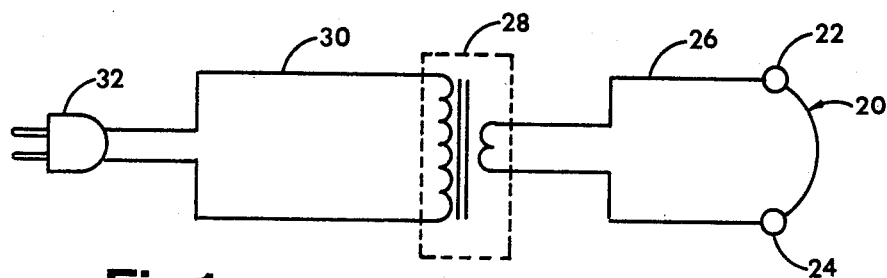
FIG. 1 is an electrical diagram.

FIG. 1 diagrams the simple and conventional electric circuit of the invention. Insulation-removing heating and scraping strip 20 detachably mounts at each end to a respective electrode 22, 24, all in the secondary circuit 26 of a current transformer 28 which may have suitable current, such as 110VAC supplied to the primary circuit 30 through a suitable connector, such as plug 32.

Figure 2:
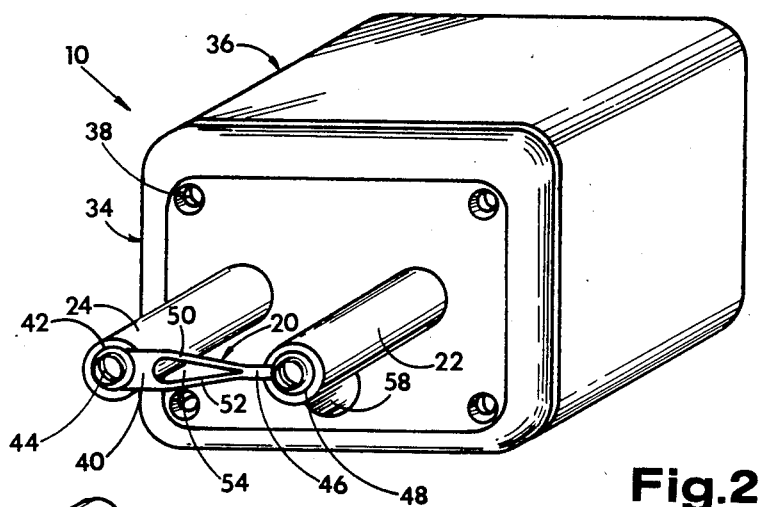
FIG. 2 is a perspective view of a part of the invention.

FIG. 2 shows an embodiment 10 of the invention. Of the circuitry described above, three elements are visible, the conductive strip 20 and the electrodes 22, 24 mounting it.

The electrodes may extend substantially in parallel spacing and perpendicularly from the transverse centerline of the cover 34 of housing 36, that contains the current transformer. They may be symmetrically disposed about the vertical centerline of the housing. Screws 38 disposed at respective corners secure the cover to the housing, adjustably for purposes to be described.

Strip 20 has at the first end 40 a loop 42 through which a screw 44 secures it to end of the first electrode 24, and similarly at the second end 46 a loop 48 by which a second screw attaches it to the second electrode 22.

The strip 20 is unitary. As in one embodiment that has worked well it may be about 1¼ inches(3.3 cm) long between centers of the electrodes and may be flat and about 0.007 inch (0.2 mm) thick and at the widest about ¼ inch (0.6 cm); at 46, 3/32 inch (0.2 cm) and the transformer is a two watt G. E. 110V current transformer.

The strip 20 also is substantially uniformly heated along the jaws, or margins 50, 52 on either side of the aperture 54, which is preferably a continuous margin teardrop-shaped slot that extends longitudinally along the strip and that has both ends rounded for fatigue resistance and smooth operation not marring the conductors of wires stripped. The first end 40 of the strip 20 is relatively broad, being as wide as the outer diameter of the loop in the first end. As means for gripping insulation of insulated wire within a range of wire sizes at said aperture, the margins 50, 52 of the slot preferably begin as parallel-sided straight runs that converge from the rounded portion of the tapered or teardrop shape of the slot to the junction at the second or narrower end 46 of the heated strip. The rounded portion of the teardrop must be large enough to admit the largest wire to be stripped. The apex of the slot may be slightly radiused, but should be no larger across than the conductor of the smallest wire to be stripped.

STRIPPING OPERATION

In operation, an end of the thermoplastically-insulated wire to be stripped is freely passed through the slot a distance equal to the length to be stripped and is then moved toward the apex or throat of the slot until resistance of the conductor is felt, then is twirled or rotated about the axis of the wire a half-turn each way and withdrawn while still jammed in the throat of the heated strip.

The twirling produces a uniform circular end on the insulation but if a uniform circular end is not necessary, twirling is not necessary in smaller wire sizes, the simple jamming towards the apex and withdrawal all in one motion saving even more time. Wire sizes from No. 10 to No. 30, solid or stranded, are easily stripped.

Relative motion between wire and strip may be produced by holding the housing in either hand and moving the entire stripper relative to wire to be stripped, or the wire may be held in the other hand and also moved, or the housing may be rested on any face on a table and the wire alone moved, for which the housing may be clamped to the table, as by means of hole 58 in the lower front of the housing.

Figure 3:
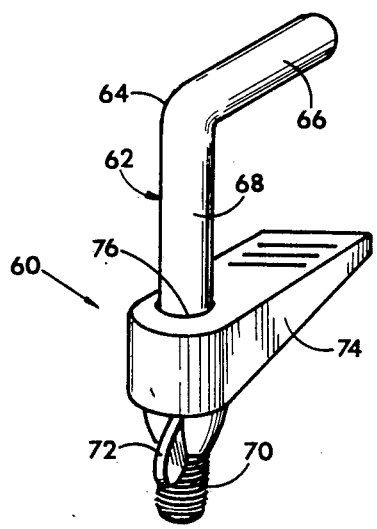
FIG. 3 is a clamp part usable with the FIG. 1 part.

FIG. 3 shows a clamp 60 to coact with the hole in the lower front of the housing and clamp the housing to a table or shelf.

Rod 62 of the clamp has right-angle bend 64. On one side of this is a straight arm portion 66 for protruding into the hole in the housing. On the other side of the bend is another straight arm portion 68 with a threaded end 70. On the threaded end a wing nut 72 adjustably applies force on a jaw 74 which is parallel with the arm 66 and has a hole 76 at one end slidably receiving the arm 68.

In use, this clamp provides for the housing 36 to be adjustably clamped in position within a range of distances from the edge of a table, while preserving good clearance below the heated strip.

Figure 4:
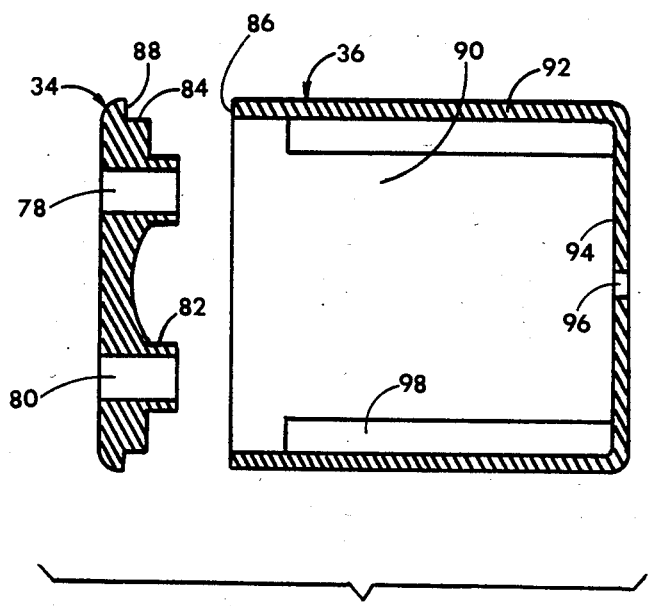
FIG. 4 is an assembly detail in partial section.

FIG. 4 shows the general assembly relation of cover 34 and housing 36 in partially sectional view. Holes 78, 80 in the cover provide for the electrodes to be press-fitted in them, with or without knurling. On the rear face of the cover, each hole may have a circular flange 82 around it for better electrode support. The perimeter of the cover has a peripheral face 84 for fitting inside the housing rim 86 and substantially at right angles to it a rear-face peripheral flange 88 abutting the rim of the housing. The housing is a rectangular-section cup, with four flat sides 90, 92 indicated, joined by a flat bottom 94 with a hole 96 for the power cord. A boss 98 along each of the wall junctions extends from near the open end of the housing to the bottom and serves as reinforcement and also as will be seen, for attachment of housing and cover.

Figure 5:
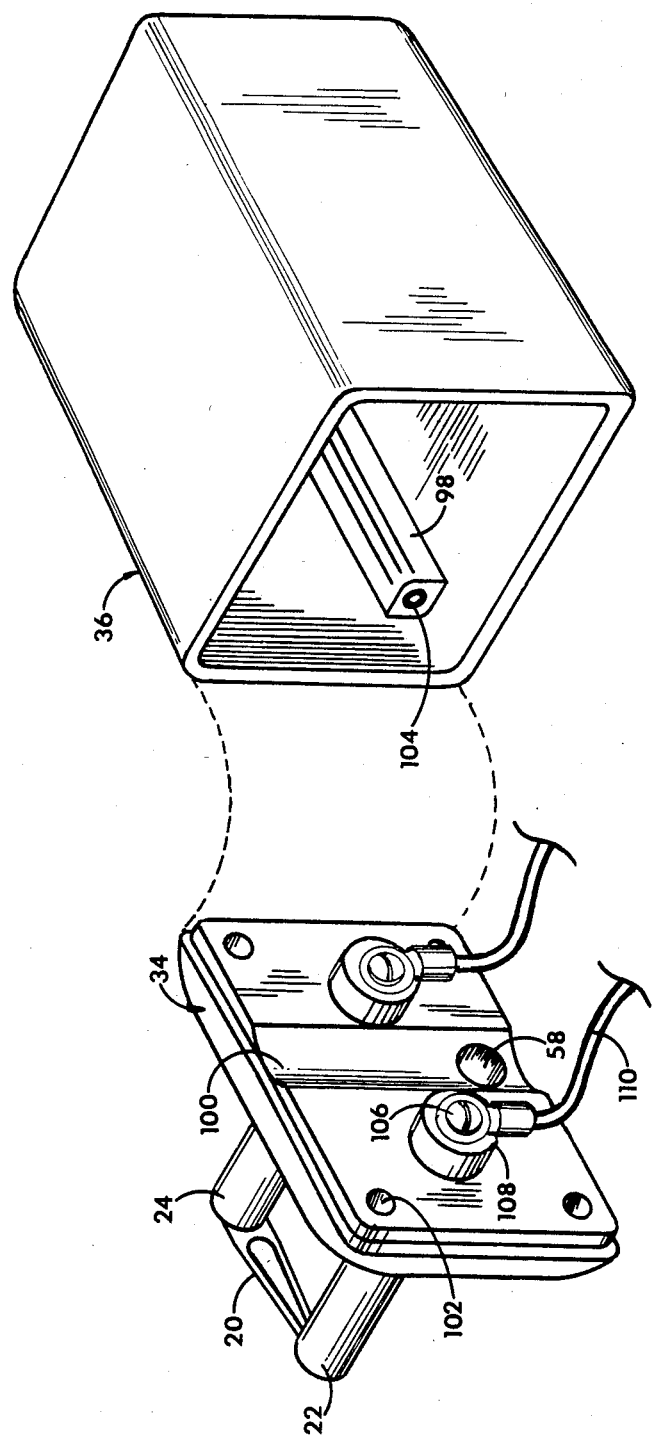
FIG. 5 is an exploded perspective view showing electrical connections and relation of cover to housing.

FIG. 5 shows, further, cover 34 and housing 36 joining details, and wiring-connection details.

The cover 34 is a rectangular plate with a rounded groove 100 reducing the thickness along the centerline between the electrodes 22, 24 to define a bending plane.

Holes 102 are for attachment screws to pass through and self-thread in, or otherwise engage, holes 104 in the ends of the bosses 98. Hole 58 is the clamping hole. Strip 20, is, as noted, held by the electrodes, which are force-fitted into flanged holes in the cover. Electrical connection is conventionally made by screws 106 threaded into the rear ends of the electrodes and engaging terminals 108 on the wires 110.

FIG. 6 shows the provisions for continuous tensioning of the heated strip 20, hot or cold.

The rear-face peripheral flange 88 of cover 34 has a "rocker-bottom" contour, symmetrical parts 88a and 88b being in two planes at an angle with each other, with the apex inward along the centerline between the electrodes. Rim 86 of the housing 36 is planar. Each of the two rear-face peripheral flange faces is out-of-plane with the plane of the rim by an appropriate angle "a", which may be three degrees.

INSTALLING AND TENSIONING THE STRIP

When the plate-like cover 34 is in the relaxed position shown, the end loops of the strip 20 just fit over the centers of the front ends of the electrodes 22, 24 and the strip is easily removed or installed using the tight-fitting screws.

When the cover 34 is attached to the housing 36 the attachment screws 38 draw the cover towards a planar configuration, bending it about the fulcrum comprised by the apex 112 of the two planes of the cover rear face peripheral flange bearing on the housing rim 86, and thereby angularly biasing apart the first or front ends of the elongate electrodes 22, 24, tensioning the strip 20.

The cover and the housing may be made of molded thermoplastic such as polystyrene or ABS, and in any case, the resilience of the system coupled with the long extension of the electrodes is sufficient to insure continued tensioning of the strip 20 regardless of whether hot or cold. The strip may be of "NICHROME" and the electrodes may be of any suitable conductive metal such as aluminum.

FIG. 7 details the relation of the cover 34 and housing 36 during assembly.

FIG. 8 shows a detail of the relation of cover 34 and housing 36 at an intermediate position of adjustment.

It will be appreciated that the housing could have a surface producing bending of a straight cover, without departure from the scope of the invention. Also conventional means for selected current adjustment can be provided for adjusting heating.

This invention is not to be construed as limited to the particular forms disclosed herein, since these are to be regarded as illustrative rather than restrictive. It is, therefore, to be understood that the invention may be practiced within the scope of the claims otherwise than as specifically described.

For example, the strip 20 may be coated with "Teflon II" (TM) or the like, except at the ends, for even greater freedom from sticking, because the highest temperature necessary is 180° C.

What is claimed and desired to be protected by U.S. Letters Patent is:

1. A system for thermal stripping of a length of insulated wire, comprising: a conductive strip with structure defining an aperture therein proportioned for contact with a length of insulated wire passed through said aperture, means for heating the conductive strip and removing insulation from a length of insulated wire on a said passage through said aperture, means providing for gripping of insulation of insulated wire, within a range of sizes of insulated wire, at said aperture, comprising: said structure including first and second margins, said first and second margins converging and defining a shape for said aperture tapered from a larger end for freely receiving said insulated wire to a smaller end at which said converging first and second margins wedge between them and grip insulation passed thereagainst, means causing uniform heating along said converging first and second margins, comprising: said first and second margins being uniform in width, and longitudinally disposed along said conductive strip, said means for heating comprising first and second electrodes, means for connecting said first electrode at a first end of said conductive strip, means for connecting said second electrode at a second end of said conductive strip, and means for tensioning said conductive strip including means for biasing apart said means for connecting said first electrode and said means for connecting said second electrode.

2. A system as recited in claim 1, said conductive strip having uniform thickness.

3. A system as recited in claim 1, said conductive strip being flat.

4. A system as recited in claim 1, said conductive strip having a loop at each end thereof for attachment to a respective said electrode.

5. A system for thermal stripping of a length of insulated wire, comprising: a conductive strip with structure defining an aperture therein proportioned for contact with a length of insulated wire passed through said aperture, means for heating the conductive strip and removing insulation from a length of insulated wire on a said passage through said aperture, means providing for gripping of insulation of insulated wire, within a range of sizes of insulated wire, at said aperture, comprising: said structure including first and second margins, said first and second margins converging and defining a shape for said aperture tapered from a larger end for freely receiving said insulated wire to a smaller end at which said converging first and second margins wedge between them and grip insulation passed thereagainst, means for tensioning said conductive strip including: said conductive strip having first and second ends: the means for heating comprising first and second electrodes, means connecting the first electrode to the first end of said conductive strip, means connecting the second electrode to the second end of said conductive strip, and means for biasing apart said first and second electrodes.

6. A system as recited in claim 5, said first and second electrodes being elongate, all said means connecting being at a respective first end of the first electrode and the second electrode, a plate, each of the first and second electrodes having a second end connected to said plate, and the means for biasing comprising means for bending said plate.

7. A system as recited in claim 6, the means for bending the plate comprising a housing, said plate being a cover for fitting on said housing, means for tightening the cover on said housing, at least one of said cover and housing having a contour at said fit causing bending of the cover when tightened to the housing.

8. A system as recited in claim 7, said cover having a recess therein defining an axis for said bending.

* * * * *